(12) United States Patent
Castellari

(10) Patent No.: US 6,205,743 B1
(45) Date of Patent: Mar. 27, 2001

(54) AUTOMATIC MACHINE FOR MANUFACTURING, CHECKING, FILLING AND CAPPING BOTTLES MADE OF THERMOPLASTIC MATERIAL

(75) Inventor: Fabrizio Castellari, Bologna (IT)

(73) Assignee: Techne Technipack Engineering Italia S.p.A. (IT)

( * ) Notice: Subject to any disclaimer, the term of this patent is extended or adjusted under 35 U.S.C. 154(b) by 0 days.

(21) Appl. No.: 09/291,375

(22) Filed: Apr. 14, 1999

(30) Foreign Application Priority Data

Apr. 16, 1998 (IT) .............................. BO98A0244

(51) Int. Cl.$^7$ ................................. B65B 57/00
(52) U.S. Cl. .................. 53/53; 53/281; 53/561; 209/597
(58) Field of Search ................ 53/53, 561, 285, 53/287, 281, 76; 209/597

(56) References Cited

U.S. PATENT DOCUMENTS

| | | | |
|---|---|---|---|
| 3,785,116 | * | 1/1974 | Munz et al. . |
| 3,818,785 | * | 6/1974 | Wakabayashi . |
| 4,056,914 | * | 11/1977 | Mnilk et al. . |
| 5,621,960 | * | 4/1997 | Kaminski ................ 53/561 |
| 5,673,533 | * | 10/1997 | Wang et al. ............. 53/53 |
| 5,759,218 | * | 6/1998 | Martin et al. ........... 53/561 |
| 5,970,823 | * | 10/1999 | Martelli ................... 53/201 |
| 6,047,525 | * | 4/2000 | Kiera et al. ............. 53/561 |

FOREIGN PATENT DOCUMENTS 1260296    4/1996    (IT) .

* cited by examiner

Primary Examiner—Eugene Kim
(74) Attorney, Agent, or Firm—Larson & Taylor, PLC

(57) ABSTRACT

The parisons (P) manufactured by an extrusion group (1,1") are gripped between the mould and the counter-mould (S,S') mounted, together with the associated actuating mechanisms, on a carriage (19) which, after receiving the parisons, moves into a blowing station (Z1) for the formation of the bottles which then remain suspended from the nozzles of this station. By means of a set of three self-centring closing and opening grippers (P1, P2, P3), the groups of bottles are then transferred from the said blowing station to a sprue-removal and mouth-calibrating station (Z2), to a quality control station (Z3) and then to a filling station (Z4). By means of a fourth self-centring gripper (P4) with an independent movement the filled bottles are finally transferred into an end capping station (Z5). A conveyor (59) which collects together and removes all the production waste is provided underneath the various work stations which are aligned with each other. A single electronic unit (178) manages automatic control of the machine. In intermediate positions, two cranes (173, 175) are provided for facilitating the maintenance and size-changing operations.

20 Claims, 12 Drawing Sheets

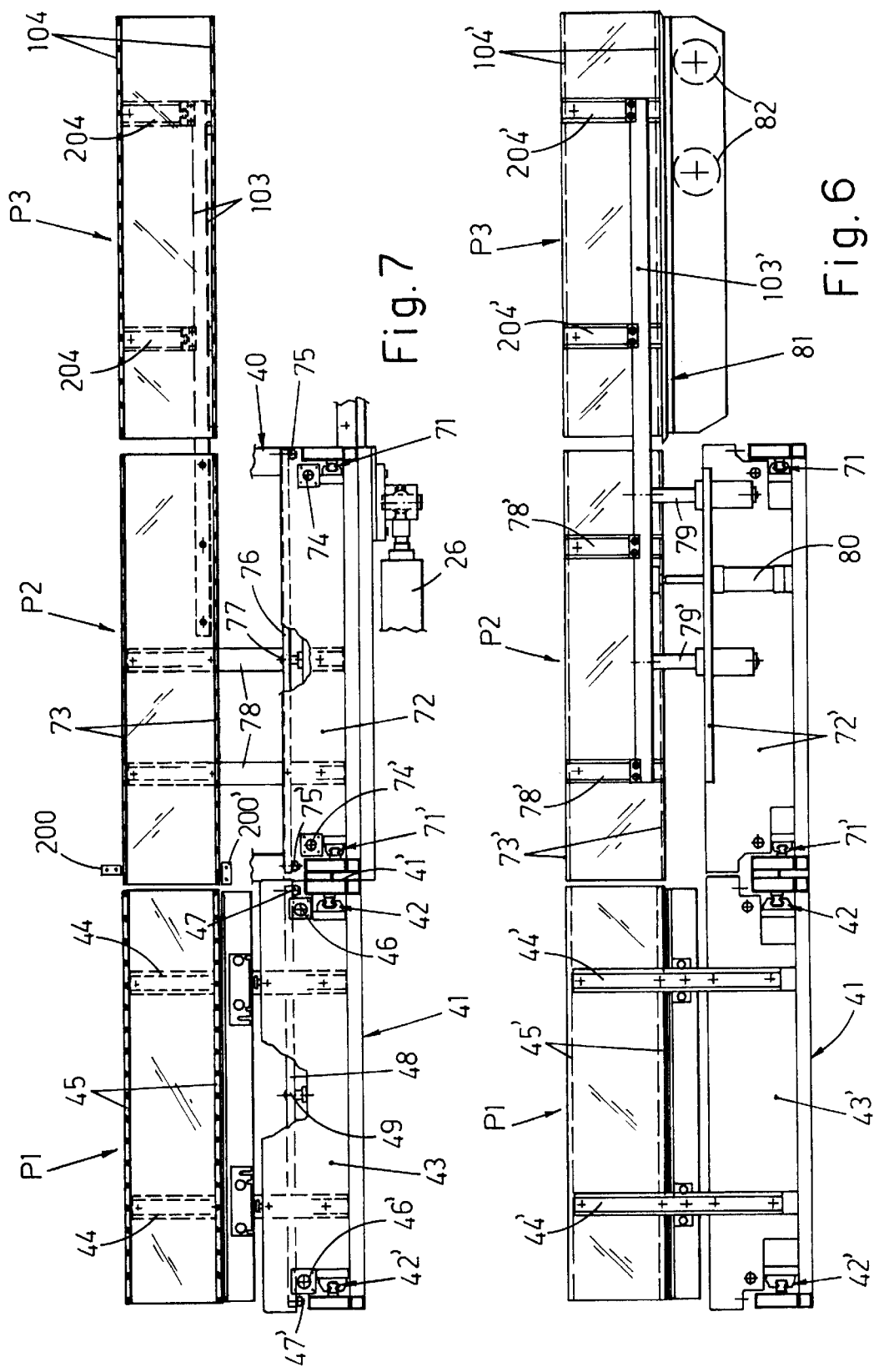

AUTOMATIC MACHINE FOR MANUFACTURING, CHECKING, FILLING AND CAPPING BOTTLES MADE OF THERMOPLASTIC MATERIAL

DESCRIPTION

The invention relates to an automatic machine for manufacturing, checking, filling and capping plastic bottles. At present plastic bottles are manufactured in locations which are often different from the locations of use and, in any case, after manufacture, they are stored and only subsequently are they taken out of storage and supplied to the filling and capping machine. During the storage, transportation and storage-removal stage, many bottles are damaged and create problems during the subsequent stage of use. Storage, removal from storage and in particular transportation of the bottles are operations which increase significantly the costs of packaging the product which is introduced into the said bottles.

The machines of the known type which fill and cap plastic bottles are often very fast rotating machines which must be combined with units for supplying the bottles removed from the storage locations in loose form and units for checking the suitability of the bottles themselves, which must be interfaced with each other and with the filling machine, resulting in particular problems with regard to control of the automatic operation of the entire system, in particular during the start-up stages. In known systems, minor operating problems in a unit located upstream result in stoppage of the entire plant, thereby further increasing the packaging costs. In known plants, discarding of the defective products is performed downstream of the said plants, whereas in the connection zones between the various working units of the plant it is extremely difficult to provide the possibility of discarding defective bottles and allowing the downstream stations which have received properly formed or properly filled bottles to continue operating. The known art is therefore characterized by the use of plants which are very fast, but which are often inactive due to operating defects, and this also has a negative effect on the packaging costs.

The invention intends to overcome these and other problems and drawbacks of the known art by means of a machine with relatively small dimensions which must be periodically supplied only with the plastic material necessary for the manufacture of the bottles, the liquid to be packaged and the caps and which is able to manufacture automatically the plastic bottles and, if necessary, label them where required, remove from them the sprues resulting from the moulding cycle, calibrate their necks, check their suitability for use, fill them, checking that filling is properly performed, and finally cap them, checking for the correctness of the closure. The machine according to the invention will therefore supply full and capped bottles and will also dispose of the processing waste and the defective bottles which will be ground up and recycled. The machine according to the invention is of the linear type, with an intermittent working cycle, with the various stations located one after another and in a condition ensuring maximum accessibility for adapting them to variations in the size of the bottles. The extruder is preferably positioned perpendicularly at the front end of the machine, where the multiple-form mould and counter-mould group operates and means are provided for ensuring that, when this group closes around the parisons and the latter are cut, the extruder which remains active for the manufacture of new parisons, is raised, while the mould and counter-mould group moves one step and is brought into alignment with the blowing station which is lowered and inserts its nozzles into the group in question, for the formation of the containers which remain trapped with their mouths in the nozzles of this station. Then the mould/counter-mould group opens and is displaced so as to return into the station for gripping new parison sections, while the extruder returns in synchronism into the lowered position. The carriage which carries the mould and counter-mould group is connected to a following carriage which carries three successive grippers with a self-centring movement, which cyclically transfer the groups of thermoformed bottles from the blowing station to the following calibrating and sprue-removal station and then from this station to the following station for checking sealing and the compression strength of the said bottles and then from this station to the following filling station. In synchronism, a fourth self-centring gripper, which is mounted on its own carriage, removes the bottles from the filling station and transfers them into the capping station from where the full and sealed bottles will then be conveyed away by means of a conveyor.

All the operating stations of the machine, including the mould and counter-mould group, are mounted in cantilever fashion on a support shoulder opposite the side of the machine where the machine operator normally stands, so as to allow maximum accessibility during the inspection and size-changing operations. A conveyor belt is provided underneath the various stations, from the blowing station to the end capping station, and collects the sprue and the production waste and discharges it at the same end of the machine from where the full and capped bottles emerge. At two intermediate points along the machine, respective jib cranes are provided for rapid replacement of the components of the machine itself during the maintenance or size-changing operations. The whole machine is preferably enclosed in a housing and may be designed to operate in a controlled-atmosphere environment, useful for the packaging of products of any type, from aggressive and volatile products to food products or cosmetic or pharmaceutical products. A single electronic control unit interacts with the processors of the various working units and manages automatic operation of the entire machine in accordance with a predefined program. The machine is characterized by operating speeds which are slower than those of plants of the known type, said speeds being offset partly by the high number of bottles produced during each cycle, and basically differs from the known plants owing to the substantial lack of operating defects since, as a result of the abovementioned slow speeds, the individual operations may be performed with a high degree of precision and the bottles may be transported from one station to another with positive control. For all of the above reasons, the machine in question is competitive compared to the machines and plants of the known type.

Further characteristic features of the machine according to the invention and the advantages arising therefrom will emerge more clearly from a preferred embodiment thereof illustrated purely by way of a non-limiting example in the figures of the accompanying sheets of drawings, in which:

FIGS. 6 and 7 show a side elevation view of the parts of the carriage according to FIG. 5 and respectively show, of this group, the side facing the operator and the opposite side;

FIGS. 10, 11, 12 and 13 show a side elevation view, with parts sectioned, of the blowing station, the station for performing the sprue-removal and mouth-calibrating operations on the bottles, the station for checking the quality of the bottles and the station for filling the said bottles;

FIG. 16 shows, on a larger scale, details of the part of the station according to FIG. 14 intended for supplying the caps.

Figure 1:
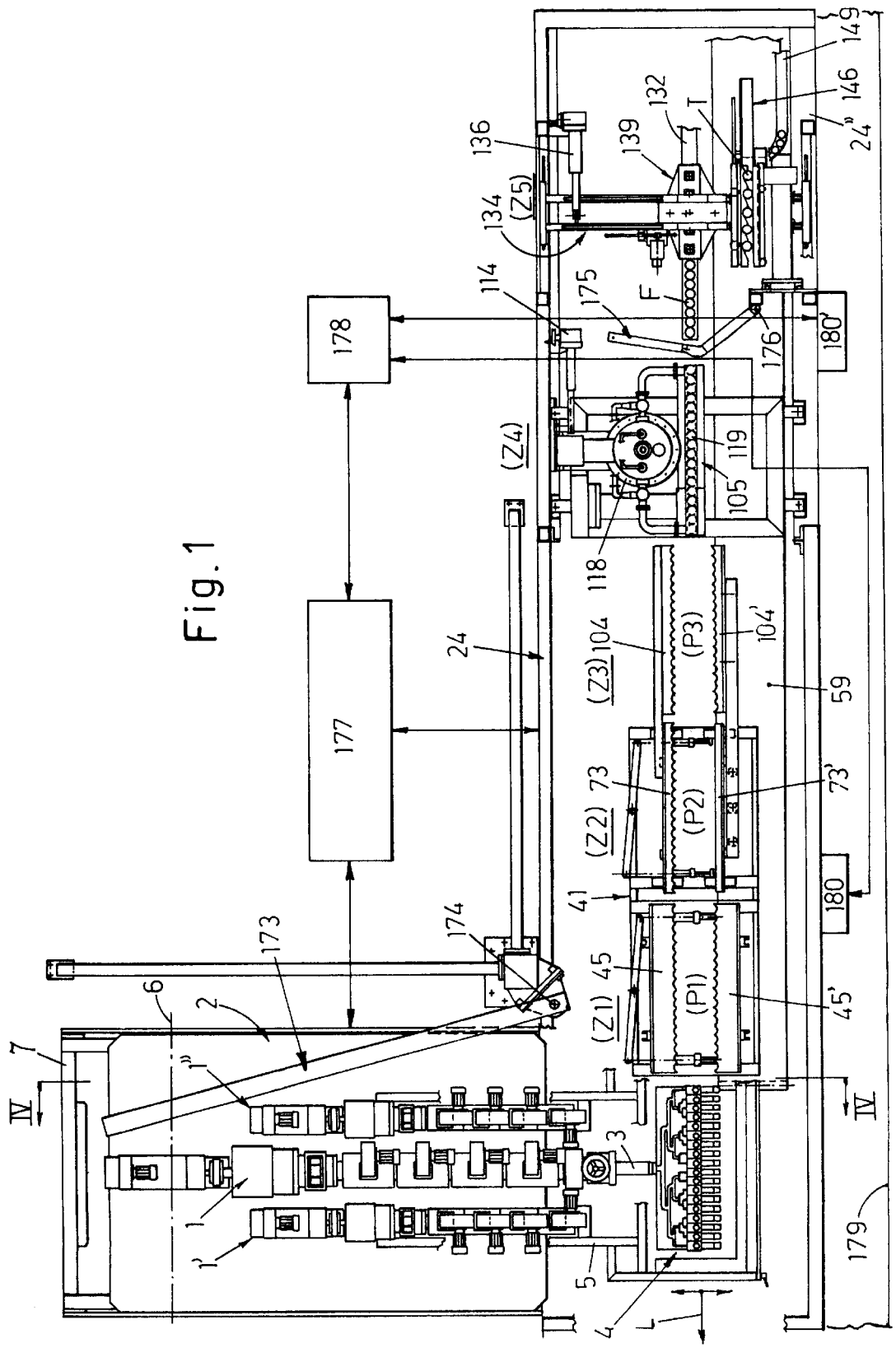
FIG. 1 is a schematic top plan view of the machine.
Figure 4:
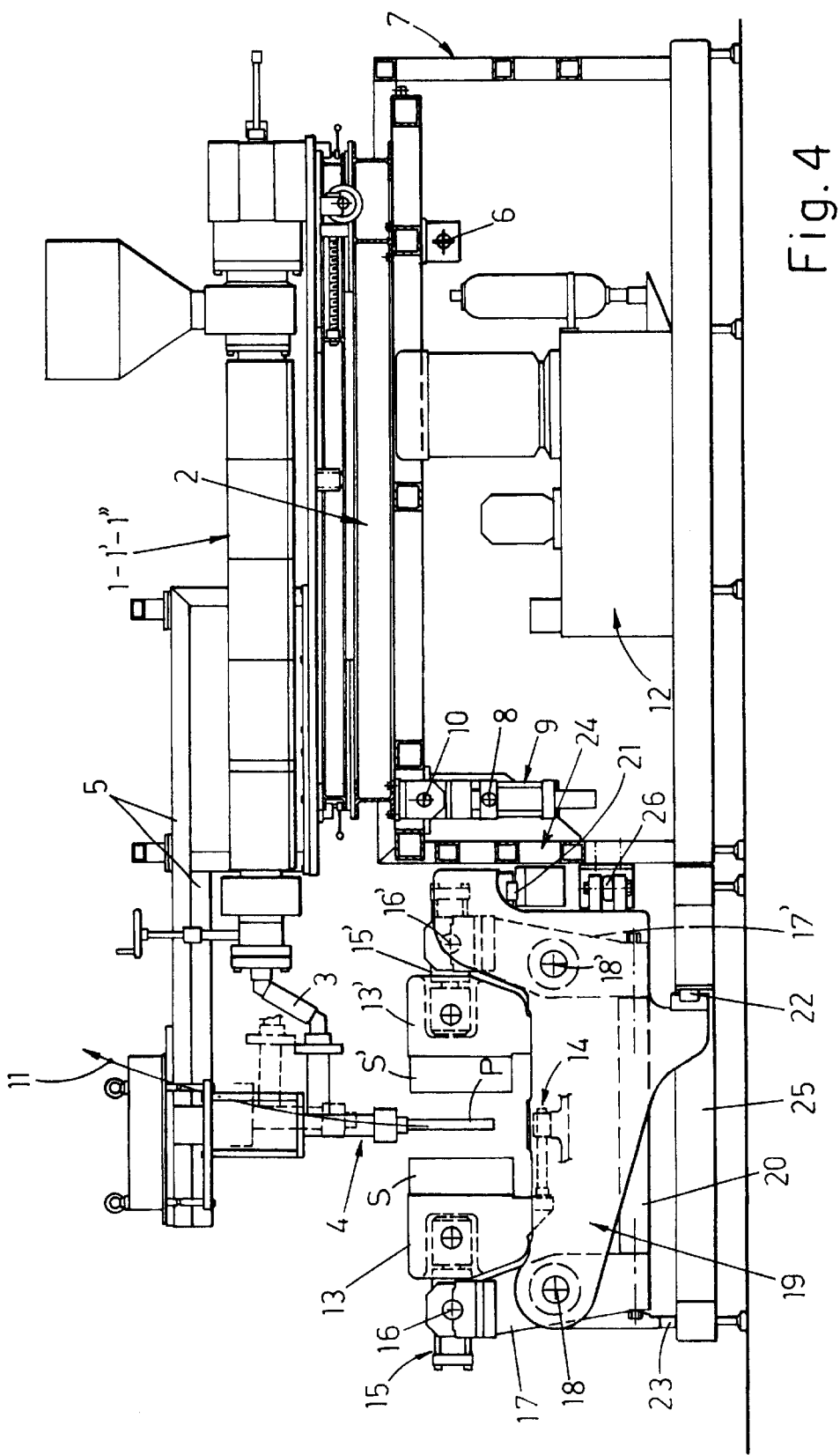
FIG. 4 shows the front end of the machine, partially sectioned along the transverse line IV—IV of FIG. 1.

With reference firstly to FIGS. 1 to 4, it can be seen that the extruder or the group of extruders 1, 1', 1" as in the example in question, intended for the manufacture of parisons with several co-extruded layers, is mounted together with all the necessary adjusting systems on a sturdy platform 2 from which the said extrusion group projects with the discharge mouth connected by means of the pipes 3 to the co-extrusion head 4 which produces several adjacent and aligned parisons P, as can be seen from the false view of FIG. 1, and which is removably attached to the structure 5 in turn fixed in cantilever fashion to the said platform 2. This platform is supported, with the possibility of performing a "pitching" movement about a transverse and intermediate axis 6, by a sturdy support structure 7 in the form of a gantry, on which a servo-control unit 9 is pivotably mounted at 8, said unit being in turn hinged at 10 with said platform 2, so as to impart to the latter the necessary pitching movement (see below) which results in the raising and lowering of the co-extrusion head 4, as shown in FIG. 4 in continuous lines and in broken lines and as shown by the curved arrow 11 centred about the pivot point 6. The gantry structure 7 may have, arranged underneath it, the control unit or units 12 which operate all the machine actuators operating by means of fluid pressure.

The parisons P which are discharged from the extrusion head 4 are fed between a mould and a counter-mould S,S' mounted on slides 13,13' with a self-centring movement which, in the example in question, form part of an apparatus protected by a separate patent application in the name of the same Applicant, in which the slides are mounted slidably on suitable guide means, not shown, are interconnected by a rack-and-pinion synchronization device 14 and are actuated by respective double-acting hydraulic cylinders 15,15' hingeably joined with their bodies at 16,16' to the top forked end of respective substantially vertical levers 17–17' which in turn are pivotably mounted in between at 18,18' on a support carriage 19 and are interconnected at the bottom end by means of reaction struts 20. The carriage 19 slides on a set of three straight guides 21, 22, 23, the first of which is fixed onto a vertical shoulder 24 partly formed by the front upright of the gantry structure 7 and extending over a section of suitable length for supporting other machine components, while the other two guides are fixed onto a horizontal base structure 25. The carriage 19 is connected to the end of the rod of a horizontal hydraulic cylinder 26 which is fixed with its body to the said shoulder 24. When the carriage 19 is opposite the extrusion group, the rod of the cylinder 26 is in the fully extended position on the side where the said carriage is located. During this stage, the mould and counter-mould group S,S' is open, as can be seen from FIG. 1, and the extrusion head 4 is in the lowered position. When, upon operation, the mould and counter-mould group is closed so as to grip the parison sections P arranged between them, the known cutting means which separate the said parison sections are activated in synchronism, the servo-control unit 9 is activated so as to raise the extruders, and the carriage 19 moves by a predetermined amount so as to transfer the mould and counter-mould group into the nearby blowing station Z1 which is described below also with reference to FIG. 10. If the bottles must be labelled, to the left of the mould and counter-mould group, as indicated by the arrow L in FIG. 1, labelling means of the known type may be provided, for example as described in Italian Patent No. 1,260,296 in the name of the same Applicant, which in synchronism insert into the cavities of the mould and counter-mould, when open, labels which are pre-treated with thermal adhesives and which are retained by means of suction in the said cavities and will adhere to the bottles when they are formed.

Figure 10:
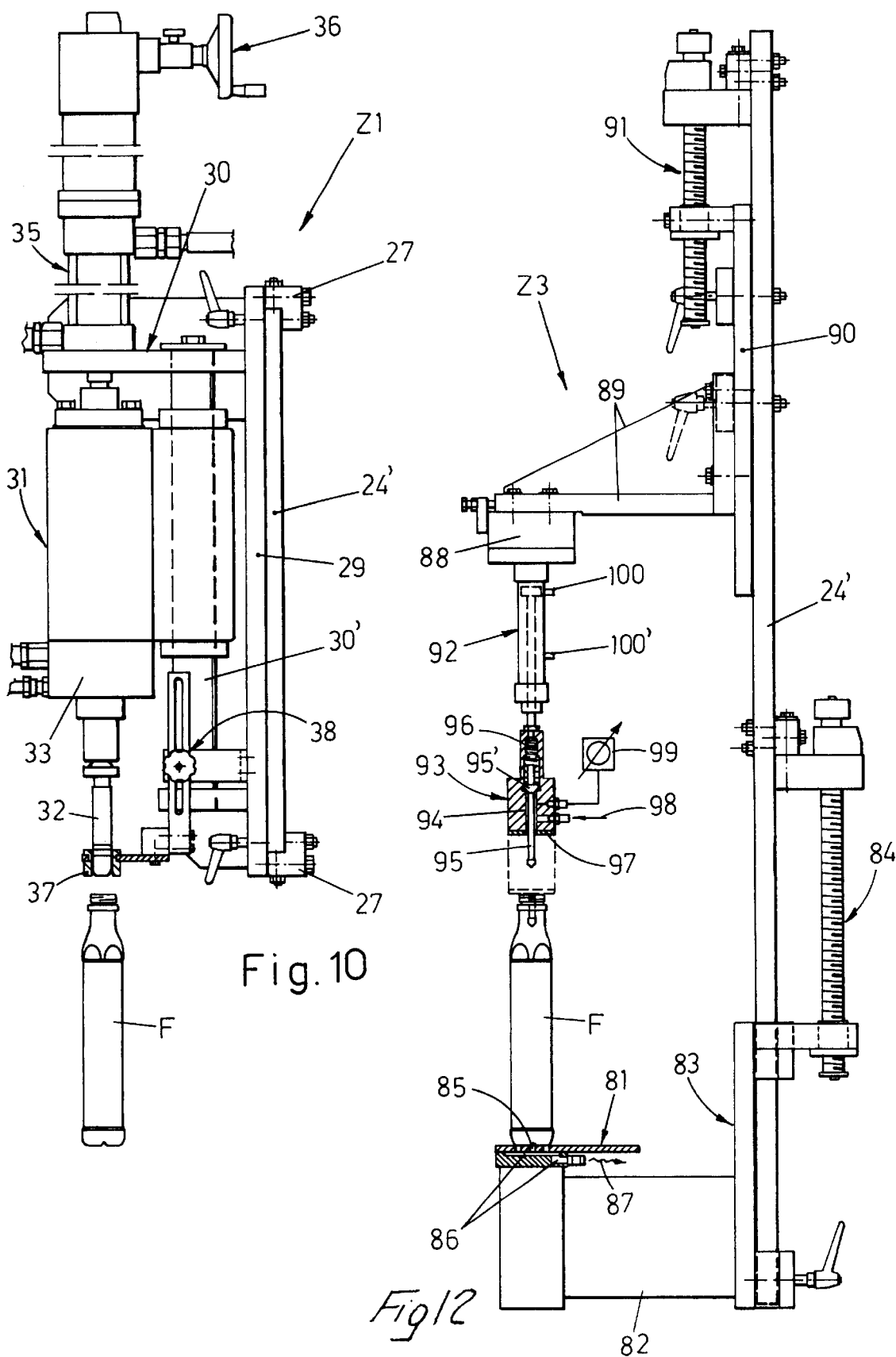

From FIG. 10 it can be seen that a slide 29 is mounted, by means of gib plates 27 and with a horizontal screw/female-thread adjusting device (FIG. 2), on a plate 24' fixed onto the abovementioned shoulder 24, said slide 29 carrying, fixed in cantilever fashion, a structure 30 with a pair of vertical guides 30' on which the blowing head 31 slides, said head being provided at the bottom with vertical and known nozzles 32 which are axially hollow and connected to the distributor 33 with the blowing pipes. The head 31 is connected directly, as can be seen in FIG. 10, or via a spacer 34, as can be seen from FIG. 2, to the bottom end of the rod of a hydraulic cylinder 35 which is fixed with its body onto the structure 30 and is provided with a known device 36 which allows precise adjustment of the heightwise rest position of the station in question, where the nozzles 32 are retracted relative to respective extractors 37 supported by a vertical-adjustment structure 38 mounted on the slide 29.

When the carriage 19 together with the mould and counter-mould group reaches the station Z1, in synchronism, activation of the cylinder 35 is performed so as to cause the downward movement of the head 31 and insertion of the nozzles 32 into the bladders of thermoplastic material which are gripped in the various adjacent cavities of the said group S,S' and, in synchronism, the nozzles blow air into the said bladders so as to inflate them and cause them to cling to the said cavities, such that said bladders assume the shape of the bottle, as indicated for example by F in FIG. 10. Once formation of the bottles has occurred, the mould and counter-mould group S,S' is opened and, while the bottles themselves remain suspended from the nozzles 32 of the blowing head which are suitably formed for this purpose, the cylinder 26 is activated so as to cause the carriage 19 to co-operate again with the extruders, in order to repeat a new working cycle. If, due to problems, a bottle should remain suspended from the associated blowing nozzle, the said bottle falls onto a rectilinear conveyor 59 (FIGS. 2, 3) which extends along the whole length of the machine, so as to collect all the production rejects and waste, as explained further below.

Figure 5:
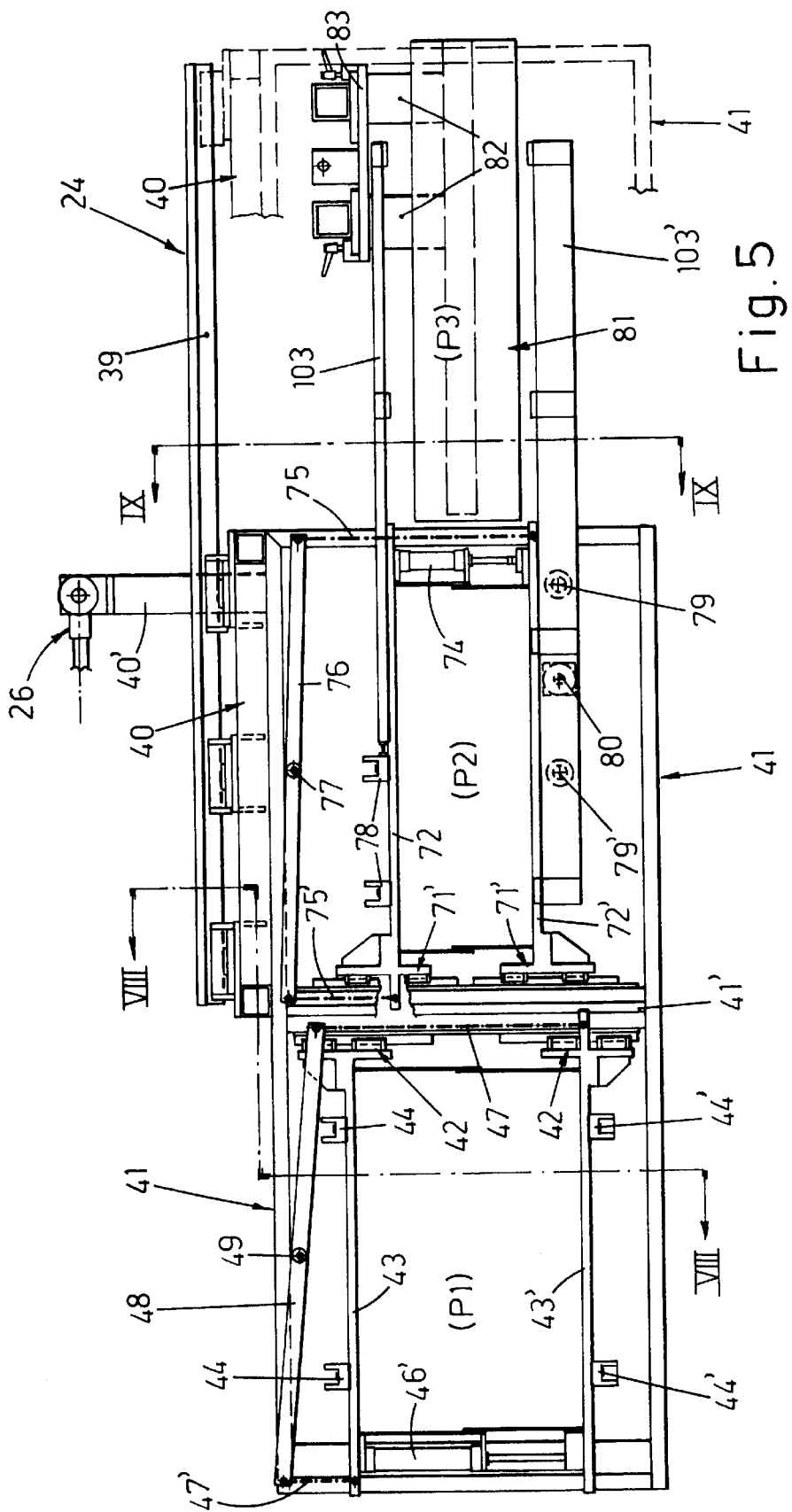
FIG. 5 shows a top plan view of the carriage which carries the first three self-centring closing and opening grippers, for transfer of the groups of bottles between the first four operating stations of the machine.
Figure 8:
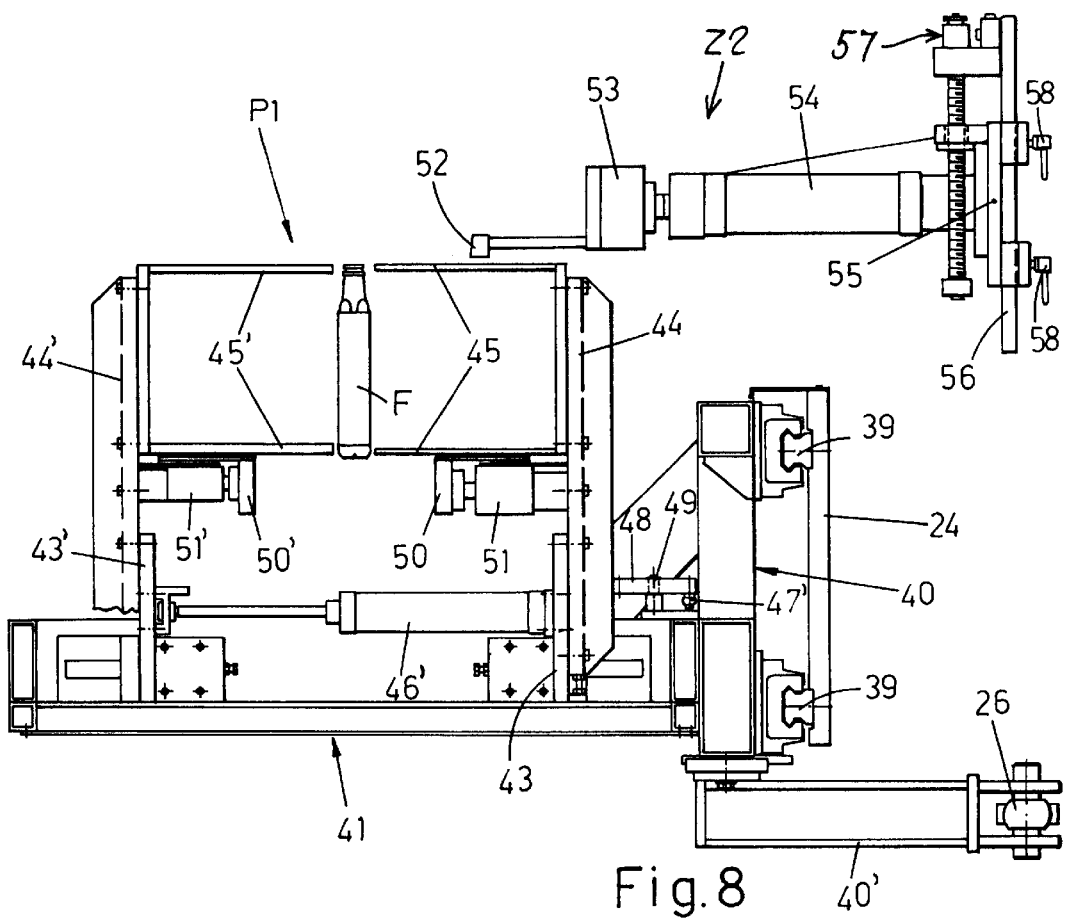
FIGS. 8 and 9 show further details of the means according to FIG. 5, respectively sectioned along the lines VIII—VIII and IX—IX.

With reference also to FIG. 5, it can be seen that the support shoulder 24 has, fixed to it in cantilever fashion, a pair of horizontal guides 39 which slidably supports a carriage 40 which, with its arm 40', is hingeably joined to the other end of the rod of the cylinder 26, such that the said carriage performs movements which are synchronized with and in the same direction as those of the said carriage 19. With reference also to FIGS. 6, 7 and 8, it can be seen that the carriage 40 has, fixed to it in cantilever fashion, a horizontal rectangular-shaped frame 41 which is divided into two equal parts by a middle cross-piece 41'. Slides 43,43' are mounted on said cross-piece and on the parallel side of the frame 41 which is directed towards the carriage 19, via guide and slide groups 42,42' which are straight and parallel with respect to these sides, said slides being arranged edgewise and parallel to the carriage 40 and having, fixed onto them, by means of uprights 44,44', the comb-shaped jaws 45,45' of a first gripper P1 which are located at different heights and have a shape suitable for gripping the bottles F of the station Z1, for example along a bottom section or along a top section. From FIGS. 5 and 8 it can be seen that the slides 43,43' are connected together at the ends by fluid-pressure cylinders 46,46' and that the displacement of these slides is made self-centring owing to the hinged connection of their said ends to tie-rods 47,47' which are in turn hingeably joined to the ends of a horizontal lever 48 which is pivotably mounted in the middle on a vertical shaft 49 supported by the frame 41. When the carriage 19 together with the mould and counter-mould group co-operates again with the extruders, the jaws 45,45' of the gripper P1 assume the open position in the blowing station, laterally with respect to the bottles F retained by the nozzles 32 according to FIG. 10 and in synchronism the said jaws are closed so as to grip the said bottles. In phase sequence, the blowing head together with the nozzles 32 is raised and the said nozzles are extracted from the bottles and leave them free, also owing to the action of the extractors 37 which prevent raising of the bottles. When the carriage 19 together with the mould and counter-mould group is then transferred into the blowing station, the gripper P1 with the bottles is transferred into a following station Z2 which performs upper and lower sprue-removal and calibrating of the mouth of the bottles which are temporarily held by the said gripper P1.

Figure 11:
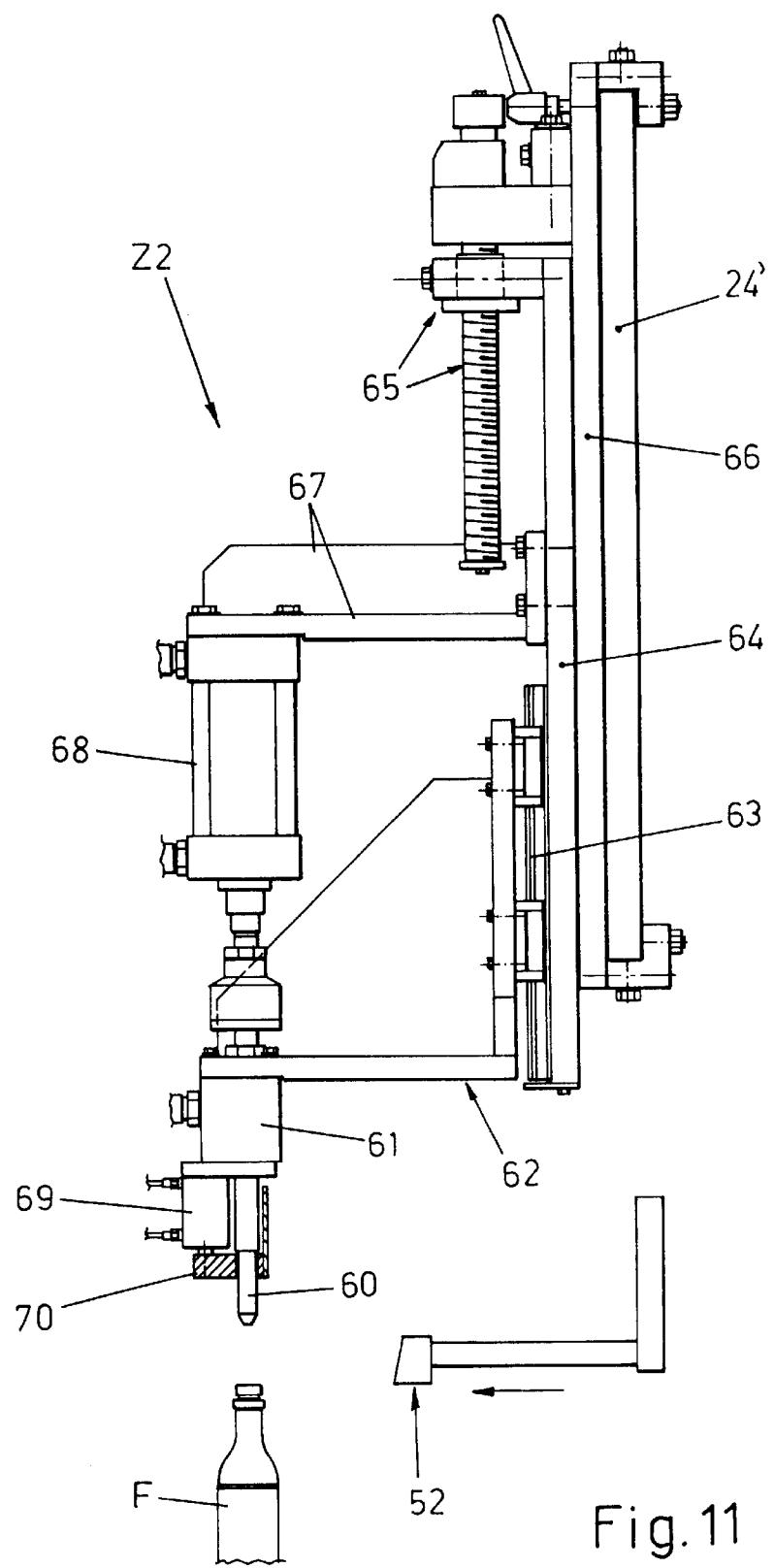

From FIG. 8 it can be seen that the uprights 44,44' which carry the jaws of the gripper P1 have, mounted on them, opposite and known groups 50,50' which are operated by respective cylinders 51,51' and which, in the station Z2, are activated so as to perform removal of the sprue from the bottom of the bottles. Still from FIG. 8 it can be seen that removal of the sprue from the top of the bottles is performed by a unit which is located in the station Z2 and which comprises a comb-shaped cutter 52 mounted on a slide 53 actuated by a cylinder 54 which, together with the guide of the said slide, is mounted on a vertical slide 55 slidable on a guide 56 supported by the fixed support plate 24' already considered. The heightwise position of the upper sprue-removal device 52 is adjustable with precision by means of the screw/female-thread adjusting device 57 and may be fixed in the desired position using tightening means 58. The waste produced by the sprue removal from the top and bottom of the bottles falls onto the conveyor 59 (FIGS. 2 and 3) which continuously travels underneath the stations in question and is discharged from the same end of the machine from where the full and capped bottles emerge. From FIG. 11 it can be seen that the station Z2 comprises a set of vertical and cylindrical punches 60 with a tapered bottom end having dimensions which are proportional to those of the mouth of the bottles and cooled by the internal and forced circulation of a liquid supplied by the header 61 by means of which the said punches are mounted on a slide 62 slidable on a vertical guide 63 in turn fixed onto a further slide 64 which is guided with the possibility of vertical displacement, also by means of the screw/female-thread adjusting device 65, on a plate 66 which is fixed onto the vertical support plate 24'. The slide 64 has, mounted on it in cantilever fashion, an arm 67 which supports the body of a fluid-pressure cylinder 68 connected via the rod to the slide 62 with the punches. Fluid-pressure cylinders 69 are fixed, with their bodies, underneath the header 61 and with their rod actuate the extractor 70 associated with each punch 60. The operating mode of the station Z2 is simple and obvious. At the start of each cycle, the rods of the cylinders 68 and 69 are in the retracted position and, when the bottles F have been positioned in this station, the cylinder 68 is activated so as to extend and insert the punches 60 into the mouths of the bottles which are still hot and held by the jaws 45,45' of the gripper P1 which, in synchronism, then opens and sets itself to return into the blowing station Z1, in order to grip new thermoformed bottles. The bottles engaged by the punches 60 remain suspended from the said punches owing to cooling and contraction of the material from which they are made and, owing to said co-operating engagement, the mouths of the bottles are all perfectly calibrated. If, owing to the presence of imperfections in the mouth, a particular bottle should not remain attached to the associated punch 60, the said bottle falls and is collected by the removal conveyor 59.

From FIGS. 2, 3, 5, 6, 7 and 9 it can be seen that slides 72,72' which are parallel to one another and with respect to the carriage 39 are mounted on the remaining right-hand part of the frame 41 via straight guide and slide groups 71,71', said slides 72,72' having, mounted on them, the comb-shaped jaws 73,73' of a gripper P2 which alternates with the gripper P1 for gripping of the bottles in the station Z2. The jaws of the gripper P2 are also made to perform a self-centring movement by means of a pair of fluid-pressure cylinders 74,74' and a pair of tie-rods 75,75' which are connected to the said slides and to the opposite ends of a lever 76 which is pivotably mounted in the middle, at 77, on the frame 41. From FIGS. 7 and 9 it can be seen that the jaws 73 are associated with the slide 72 by means of uprights 78, while the jaws 73' are associated with the slide 72' by means of uprights 78' and vertical slide/guide groups 79,79' and a fluid-pressure cylinder 80, with which the said jaws 73', which are normally in the high position and facing the jaws 73, may if necessary be lowered, for the purposes stated further below. When the gripper P1 is transferred into the blowing station Z1 for gripping of the bottles formed during the preceding cycle, the gripper P2 moves into the station Z2 and, during this stage, opto-electronic sensors 200,200' mounted on the left-hand end of the jaws 73 of this gripper (FIGS. 7 and 9), above and below these jaws, scan the row of bottles positioned in the said sprue-removal and calibrating station Z2 and, by means of an electronic apparatus with suitable software, detect the presence of any residual sprue above and below the said bottles, indicating to the control unit the position of any defective bottles, such that said control unit, before the jaws of the gripper in question close, is able to effect the selective discarding of any defective bottles, with activation of the associated extractor 70 which extracts the said bottles from the associated calibrating punches 60. After elimination of any defective bottles, the jaws 73,73' of the gripper P2 close and then the punches 60 of the station Z2 are raised and the associated extractors 70 are lowered so as to prevent the bottles from tending to follow the punches which are extracted and therefore prevent the said bottles from being damaged as a result of contact against the gripper P2 holding them. In phase succession, while a group of bottles is transferred from the station Z1 to the station Z2, the group of bottles which underwent calibration in the station Z2 is transferred by the gripper P2 into a following station Z3 which is now described with reference to FIGS. 2 and 12.

Figure 2:
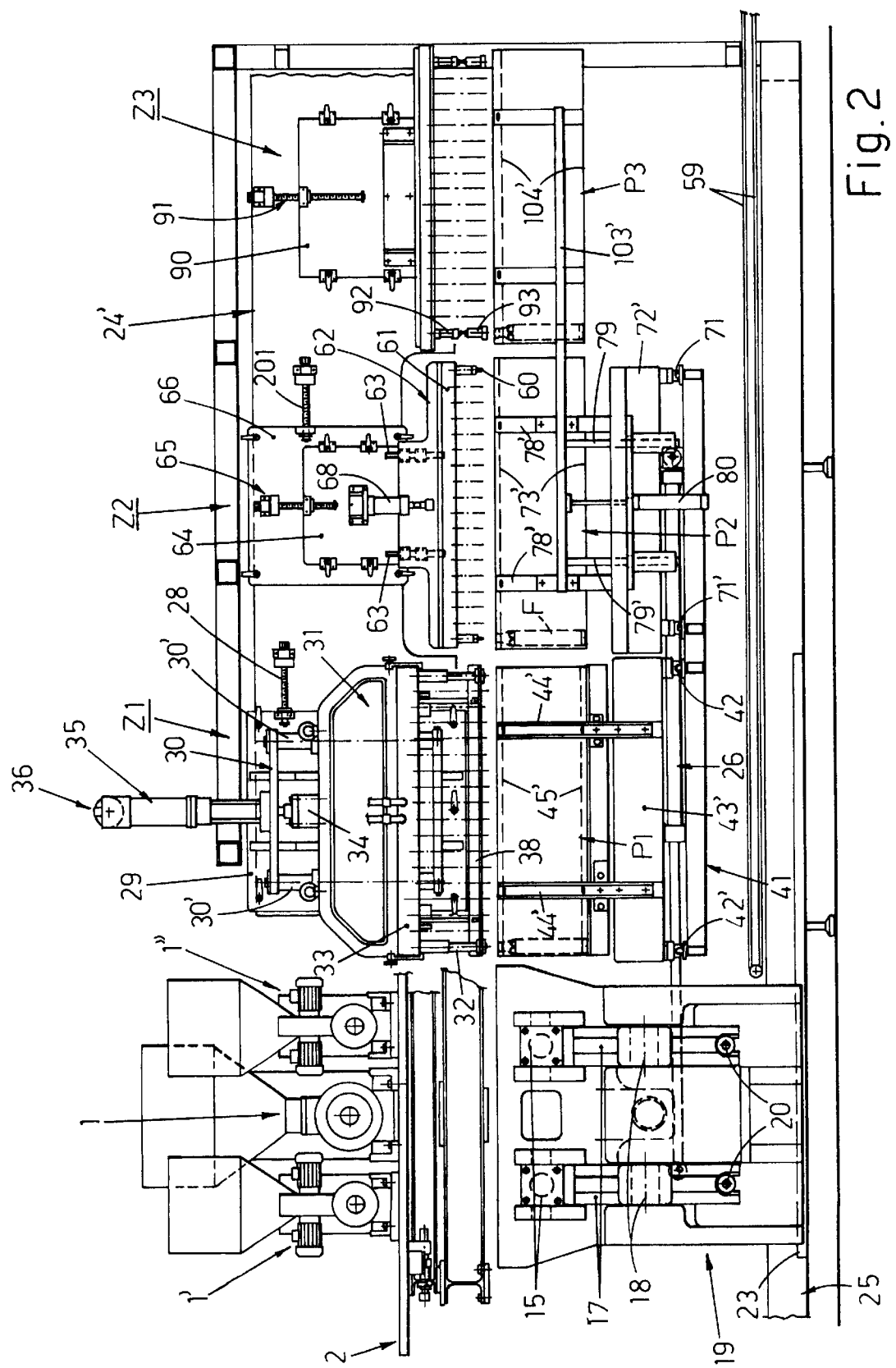
FIGS. 2 and 3 show an elevation view of a first and a second section of the machine on the side where the operator usually stands.
Figure 3:
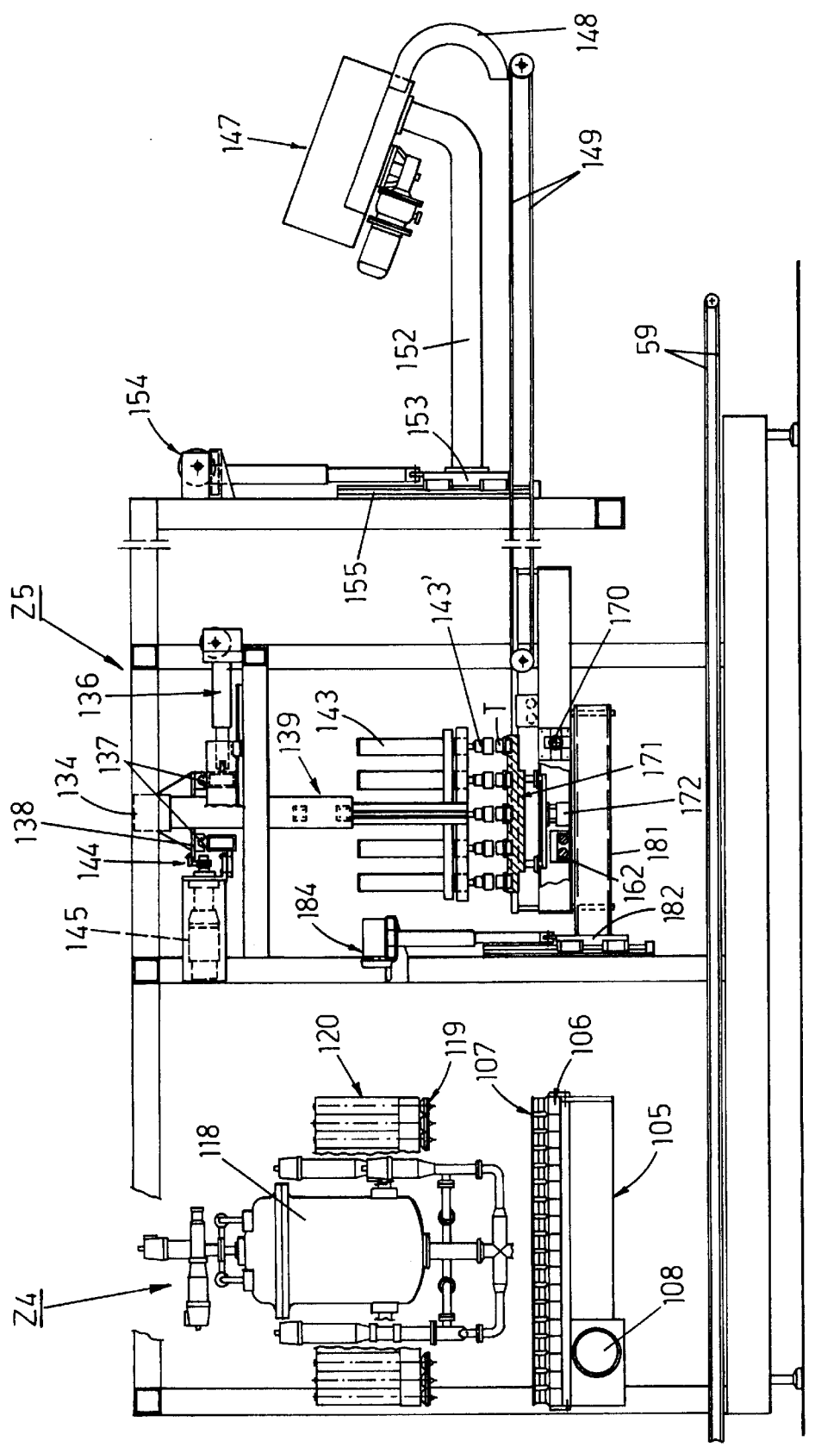
Figure 9:
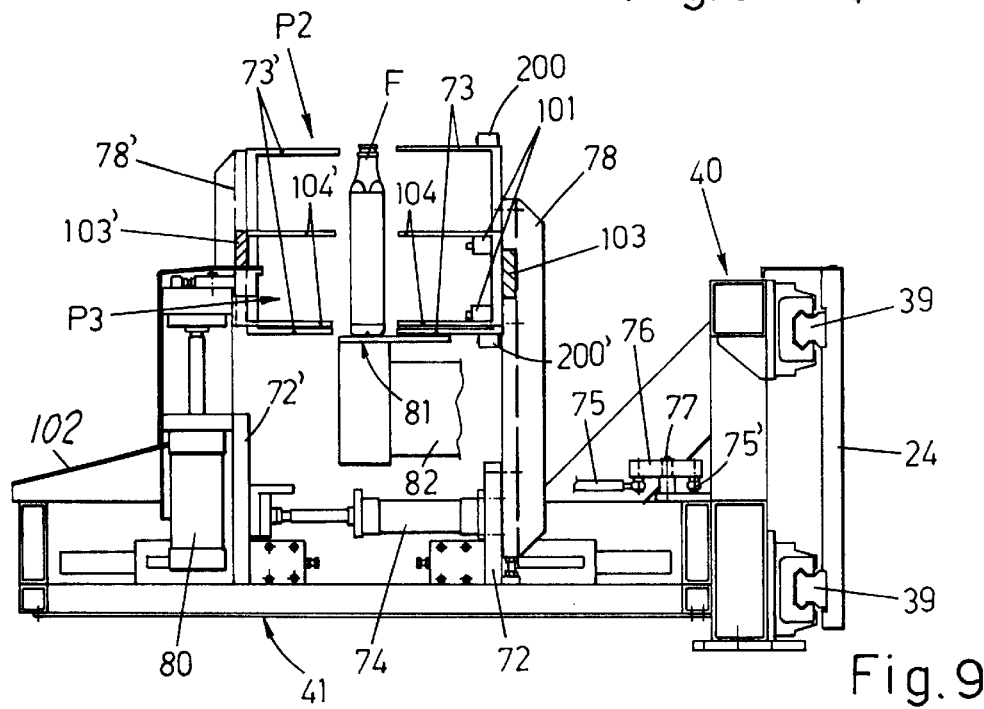

When the gripper P2 reaches the station Z3, it arranges the bottles F above and at a very small distance from the horizontal plane of a bench 81 supported in cantilever fashion by the supports 82 which are fixed to a slide 83 which is guided vertically on the plate 24' and the heightwise position of which may be adjusted by means of a screw/female-thread group 84. From FIG. 6 it can be seen that the supports 82 are arranged at the right-hand end of the bench 81, while from FIG. 7 it can be seen that the uprights 78 supporting the jaws 73 of the gripper P2 are arranged at the left-hand end of this gripper such that the jaws 73,73' are able to be positioned in the station Z3 without interference occurring between the said parts 82 and 78. The shape of the support surface of the bench 81 may vary according to the shape of the bottles F. Holes 85 are formed in this support surface, being at least one in number for each bottle which is transferred onto this surface, and each hole is connected by means of the circuit 86 to a suction source 87 via suitable intercepting means, not shown. Suction into the holes 85 may, for example, be created with ejectors of the commercially available type. When the bottles Z3 are positioned in the station Z3 and the jaws of the gripper P2 open, the bottles themselves touch the support surface of the bench 81 and are firmly held on it by the suction exerted in synchronism by the holes 85. A bar 88 is provided above the bench 81 and parallel to the latter, said bar being supported by a bracket 89 which is removably fixed onto a slide 90 which is guided vertically on the plate 24' and the heightwise position of which is adjustable vertically by means of the screw/female-thread group 91. The bar 88 has fixed underneath it, by means of their bodies, double-acting fluid-pressure cylinders 92 which are identical and vertical and the rods of which have, mounted on them, a bell-shaped body 93 which is provided with an axial cavity 94 which slidably houses with radial play a mushroom-shaped probe 95 which projects at the bottom from the said cavity and which with its head 95' is pushed by a spring 96 so as to close the top end of the said cavity 94. The bottom side of the bell member 93 is lined with a layer 97 of elastomeric material. The cavity 94 is thus normally open downwards and is instead closed upwards and two holes are provided in the middle part of this cavity, one of said holes being connected to a source 98 for the delivery of air at a correct pressure value, while the other hole is connected to a unit 99 able to emit an electric signal which is proportional to the detected pressure and which, by means of an electronic circuit not shown, is compared with predefined values. The station Z3 thus formed operates in the following manner. After the bottles have been transferred into the station Z3 and when they are still held momentarily by the gripper P2, extension of the rod of the cylinders 92 is performed so that the probes 95 enter into the bottles and the insert 97 of the bell members 93 comes into contact with the mouths of the bottles themselves, so as to close them and subject them to a compression of a predetermined value, while in synchronism the said gripper P2 opens. Magnetic relays 100–100' are mounted on the body of the cylinders 92, being arranged at a distance from one another which is slightly greater than the distance existing between the insert 97 in the rest condition and the mouth of the bottles, precisely so that if the bell members 93 descend with a predefined travel movement, which subjects the bottles to a predetermined compression and if the bottles themselves react correctly to this compression, this condition is detected by the relay 100' connected via the group 99 to a control unit, not shown, which detects the suitability of the tested bottles. If, on the other hand, the abovementioned condition does not occur, so that the piston of the cylinder 92 does not arrive as far as the relay 100' or exceeds it, the control unit considers that the tested container is not suitable for use and arranges for elimination thereof as explained further below. After the downwards movement of the bell members 93, checking of the seal of the bottles is activated by introducing air into the said bottles through the circuit 98 and detecting whether the pressure is maintained after a predefined time, by means of the device 99. If the predefined pressure is not maintained, for example owing to holes or microscopic apertures in the tested bottle or owing to a lack of a sealing action of the insert 97 against the bottle mouth or due to raising of the probe 95 as a result of interference with sprue on the top of the bottle, the checking unit to which the device 99 is connected arranges for discarding of the defective bottle. From FIGS. 1, 2, 6, 7 and 9 it can be seen that the parts which support the jaws 73,73' of the gripper P2 support in cantilever fashion stringers 103, 103' which carry the uprights 204,204' of the comb-shaped facing jaws 104,104' of a third self-centring closing and opening gripper P3. When the carriage 40 is in the retracted position as can be seen in FIG. 2, the gripper P3 is arranged with the jaws open in the aforementioned checking station Z3, so as to grip the bottles which have been tested and considered suitable for use. If, after the abovementioned checking step, some of the tested bottles must be discarded, the cylinder 80 according to FIGS. 8 and 9 is lowered so as to lower the jaws 104' of the gripper P3 underneath the support surface of the bench 81 and the nozzles 101 associated with the jaws 104 are selectively operated so as to remove from the said bench defective bottles, the pneumatic connection of which to the bench 81 is selectively neutralized, following which the jaws 73' and 104' return into the high working position. The discarded bottles, by means of chutes 102 and the like not shown, are conveyed onto the removal conveyor 59.

Figure 13:
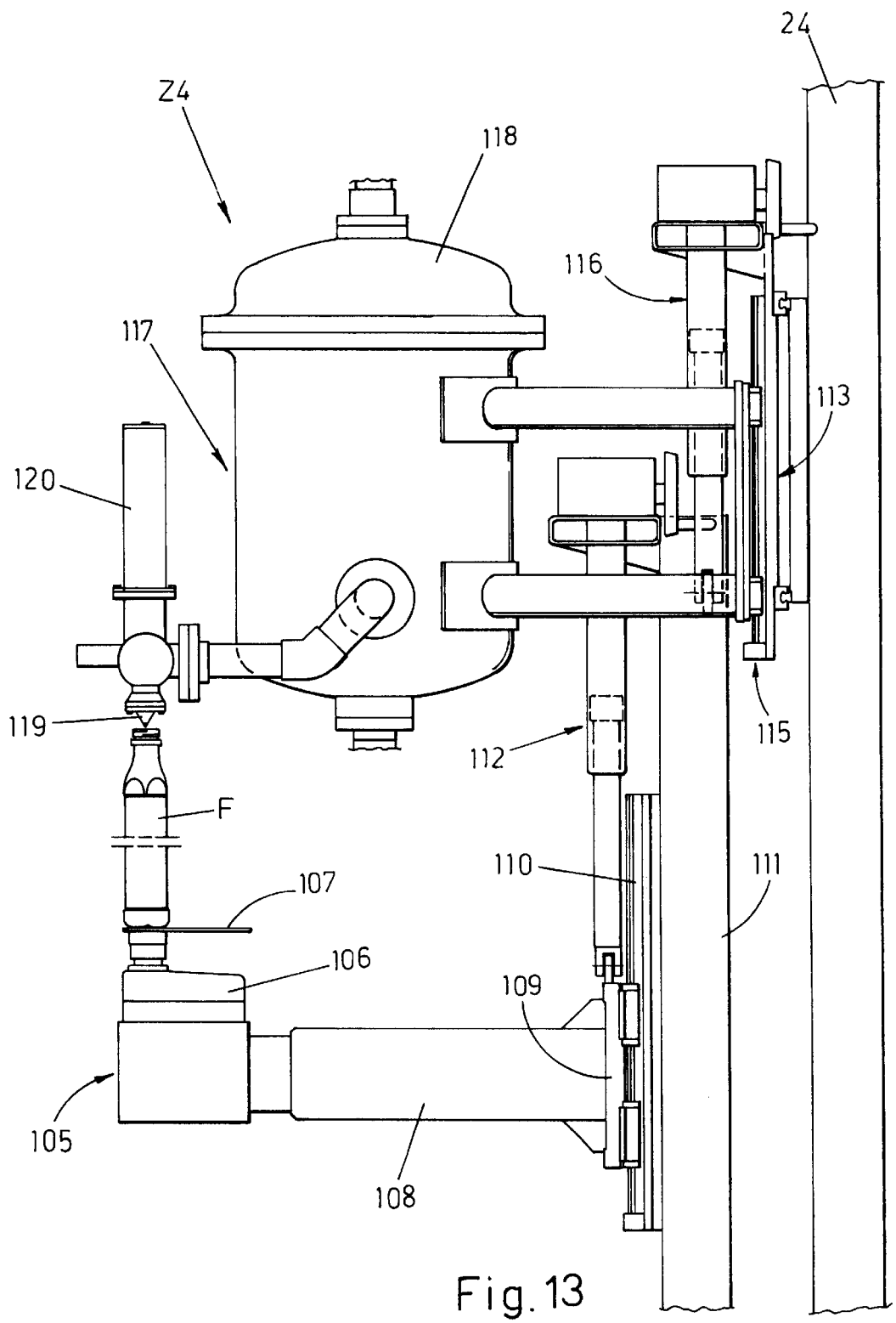

When the gripper P2 closes in order to grip the bottles in the station Z2, the gripper P3 closes in order to grip the bottles tested in the station Z3, following which suction in the bench 81 is deactivated. When the carriage 40 is made to move forwards by one step, in order to insert new groups of bottles into the stations Z1, Z2 and Z3, the grippers 104,104' transfer the tested bottles into the station Z4 which performs filling of the said bottles and is now described with reference to FIGS. 1, 3 and 13.

From the said figures it can be seen that the station Z4 comprises a straight horizontal bench 105 which supports adjacent weighing units 106, being of a number and having an arrangement such that the associated pan 107 of each unit, when the gripper P3 is opened, receives one of the bottles transported by this gripper P3. The bench 105 is attached in cantilever fashion at its left-hand end (as viewed in FIGS. 1 and 3), by means of a support 108, to a slide 109 which slides on a vertical guide 110 fixed onto a support structure 111 in turn fixed to the support shoulder 24 and the heightwise position of the said slide may be adjusted, upon variation in the size of the bottles, by means of a screw/female-thread adjusting device 112 which is fixed to the frame 111. The cantilever arrangement of the bench 105 is required in order to allow positioning, in the station Z4, of the fourth independent gripper (see below) which must subsequently remove the bottles from this same station and transfer them into the following station Z5. The shoulder 24 has, fixed to it, via a first horizontal slide/guide group 113, with associated adjusting device 114 (FIG. 1), and a second vertical slide/guide group 115, with associated adjusting device 116, a unit 117 which is designed for the controlled delivery of the liquid product to be packaged in the bottles and which comprises for example a liquid storage tank 118 connected to a set of delivery nozzles 119 which are aligned with each other, directed downwards, each aligned with a bottle F located on the scales 106 and controlled by respective proportional solenoid valves 120. When the gripper P3 arrives inside the station Z4, the bottoms of the bottles F are located at a very small distance from the surface 107 of the scales and the mouths thereof are located at a small distance away from the closed nozzles 119. The gripper P3 opens so as to deposit the bottles on the scales which detect the tare of the bottles themselves, after which the electronic unit which controls operation of the machine, causes opening of the nozzles 119 following a procedure such that the bottle remains closed, the liquid does not form any foam, filling of the bottles is performed within the time period predetermined by the machine cycle and the predetermined quantity of liquid enters into the bottles. It is obvious that the scales act as sensors for detecting the presence of the bottle and that, when no bottle is present, they prevent opening of the associated nozzle 119. The deactivation of the solenoid valves 120 and the consequent closing of the nozzles 119 is effected by the scales 106 following a procedure such that the tail-end of the liquid delivered by the said nozzles also helps form the predefined working weight. Finally, means, which can be easily realized by persons skilled in the art, are envisaged in order to ensure that the opening procedure of the nozzles 119 is automatically adjusted according to the weight detected by the scales 106 at the end of the bottle filling cycle.

Figure 14:
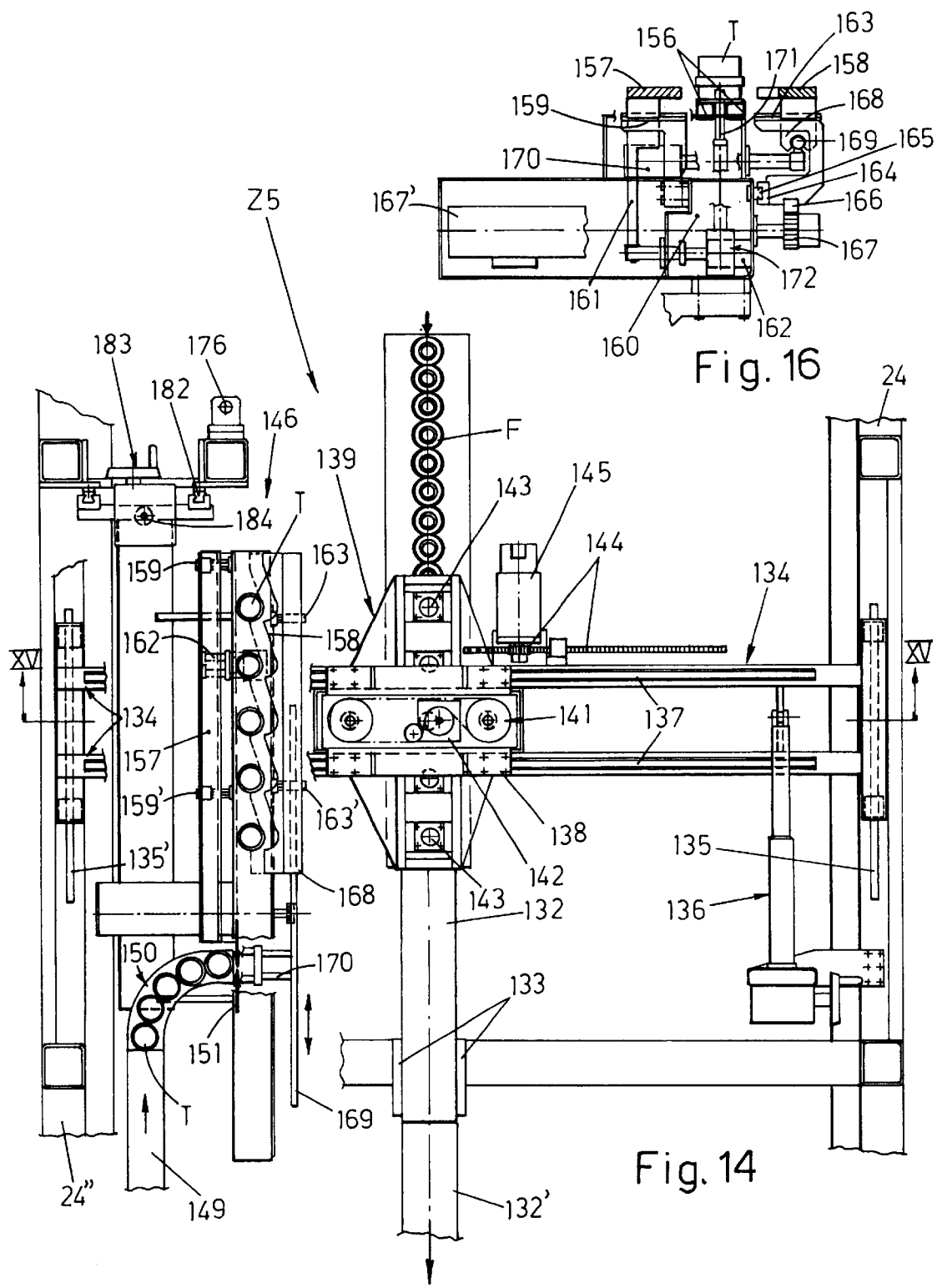
FIG. 14 shows a top plan view, as shown in FIG. 1, of further details of the bottle capping station.
Figure 15:
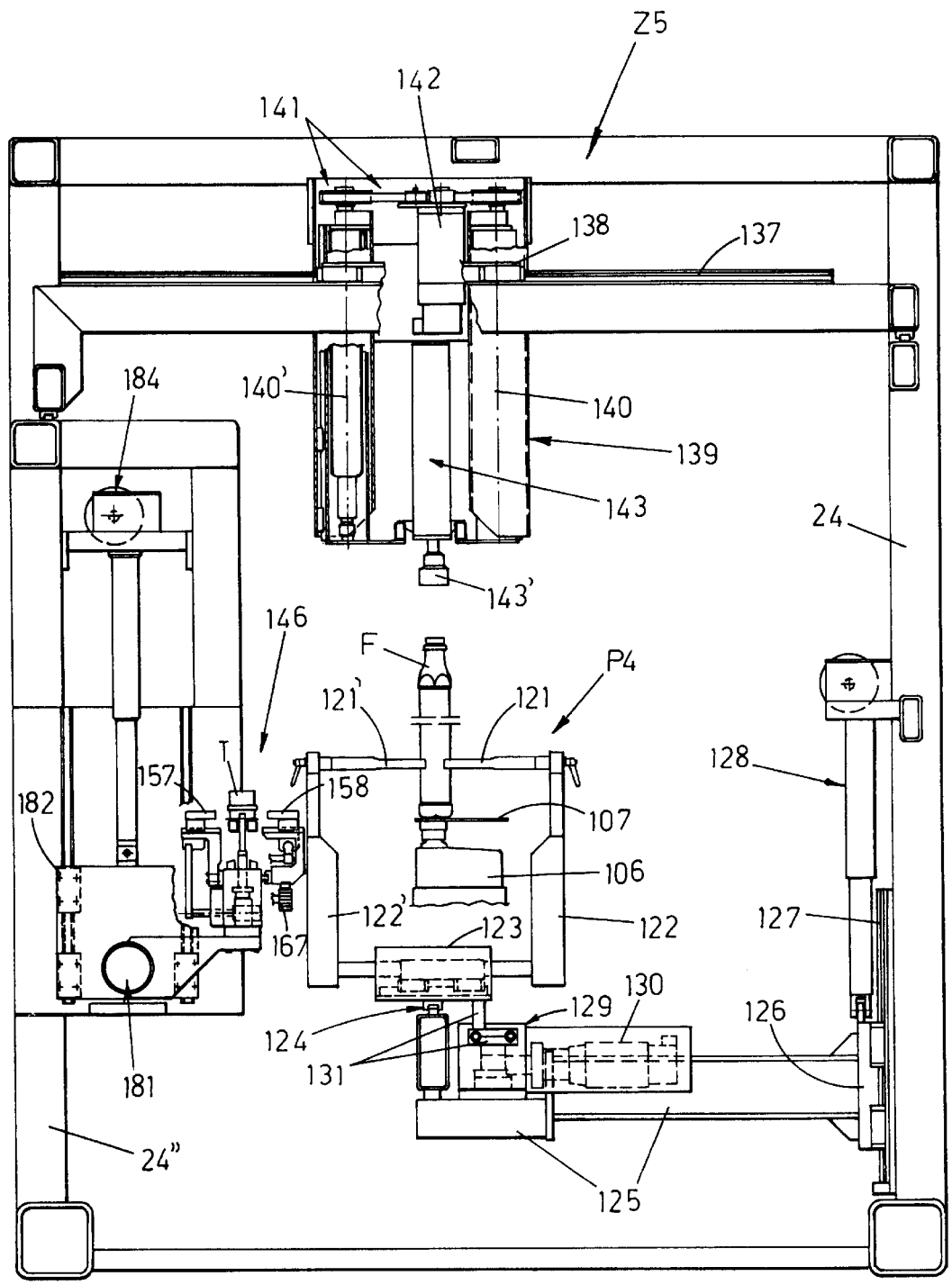
FIG. 15 shows further details of the station according to FIG. 14, partly transversely sectioned along the line XV—XV.

When filling has been completed, the bottles are gripped by the facing jaws 121,121' of a gripper P4 and transferred into the following capping station Z5 which is now described with reference to FIGS. 1, 14, 15 and 16. The jaws of the gripper P4 which are also in the form of combs and designed to grip the filled bottles, as schematically shown in FIG. 15, are supported by slides 122,122' which are mounted with the possibility of a self-centring movement, by means of fluid-pressure cylinders and rack-and-pinion synchronization devices, not shown, on a carriage 123 which is able to slide on a horizontal guide 124 oriented in the direction of the length of the machine and long enough to cover the whole of the station Z5 and the station Z4 in which it is arranged underneath the bench with the scales. The guide 124 is supported by a structure 125 which is fixed in cantilever fashion on a slide 126 slidable on a vertical guide 127 fixed onto the support shoulder 24 to which there is fixed a screw/female-thread device 128 which is connected to the said slide 126 and by means of which it is possible to adjust the heightwise position of the gripper P4 upon variation in the size of the bottles F. The structure 125 has, fixed to it in a parallel manner and at a short distance from the guide 124, an actuator 129 which performs an alternating rectilinear movement with an associated speed and phase electronic control motor 130 and to the slide 131 of which the carriage 123 with the said gripper P4 is connected.

When the gripper P4 transfers the group of bottles into the station Z5, the bottles rest on a horizontal conveyor 132 which is parallel to the said gripper and supported in cantilever fashion at the end opposite to that where the said gripper enters, as indicated by 133, so as not to interfere with the latter and controlled by means which ensure that it operates in synchronism with the said gripper P4 (see below). The station Z5 is provided above the conveyor 132 and perpendicularly with respect thereto with a bridge crane 134 which travels on horizontal guides 135,135' parallel to the said conveyor 132 and fixed onto the support shoulders 24 and 24" of the machine. The bridge crane 134 is connected to a horizontal adjusting device 136 which is secured to the shoulder 24, for adjusting the position of the said bridge crane and the means mounted on them, upon variation in the size of the bottles to be sealed. The bridge crane 134 has, mounted on it, guides 137 which slidably support a carriage 138 which carries the capping head 139 which is mounted on the said carriage by means of a pair of vertical displacement actuators 140,140', of the screw/female-thread type, which are connected by means of the positive drive 141 to a speed and phase electronic control motor 142. The capping head comprises a plurality of vertical spindles 143 of the known type which are identical and provided with a respective motor and a respective gripper for gripping the cap, for example of the pneumatically actuated type, and are arranged so as to operate on the row of bottles positioned on the conveyor 132 by the gripper P4. Since there is a relatively long time available for the capping operation, the capping spindles are of a number such that they seal the group of bottles cyclically introduced into the station Z5, in several successive stages. If, for example, the bottles which cyclically reach the station Z5 are in groups of eighteen and have small dimensions, the capping spindles 143 are, for example, five in number and are separated from one another at an interval twice that of the said bottles. The carriage 138 is connected, by means of a positive drive 144, to a speed and phase electronic control motor 145. By means of the motor 145, the capping head may be displaced from the position where it is aligned with the bottles, to a position displaced to the left (as viewed in FIGS. 14 and 15) in alignment with a cap supplying station 146, whereas, when the motor 142 is activated, the said capping head may be lowered and raised so as to remove caps from this station 146 and then screw the said caps onto the bottles. In order to allow adaptation to bottles of varying size, the station 146 is mounted on the support shoulder 24" via a double horizontal and vertical slide and guide system 181, 182 with associated adjusting devices 183, 184. The station 146 comprises (FIG. 3) a vibrating device 147 inside which the caps are supplied in loose form and which directs and aligns in a single file the said caps and which, by means of a curved guide 148 transfers them to a horizontal rectilinear conveyor 149, with lateral retaining guides, which in turn supplies the said caps to a horizontal curved guide 150, the outlet end of which is intercepted by servo-controlled means indicated schematically by the arrows 151. The vibrating device 147 and the conveyor 149 are supported by a support 152 which is fixed onto a slide 153 which is secured to a device 154 for adjusting the heightwise position and which slides on a vertical guide 155 which is fixed onto the support structure of the machine. The end part of the curved guide 150 is located to the side of and at the end of a straight channel which is parallel to the conveyor 132 and is formed at the bottom by a fixed wall 156 which extends beyond the said guide 150 and is formed laterally by a straight external side-wall 157 and by an opposite side-wall 158 in the form of combs with a sawtooth profile directed towards the inside of the channel in question. The number of equidistant recesses of the side-wall 158 is for example equal to the number of spindles 143 of the capping head 139, said recesses having the same interaxial distance and their shape being designed to contain a cap (see below). The two side-walls are arranged so as to pass from an active position, where they are situated as close as possible to one another, as shown in FIG. 14 by broken lines, such that a cap T may be arranged between the side-walls in question, being seated in each recess of the side-wall 158, to a position where they are located at a distance from one another, in which the said side-walls are shown in continuous lines. From FIGS. 14, 15 and 16 it can be seen that the external side-wall 157 is slidable transversely on a pair of supports 159,159' attached to a fixed support structure 160 and the said sidewall is connected, by means of an intermediate and guided transmission system 161, to a horizontal cylinder 162 which transmits to the side-wall 157 the abovementioned translation movement. The internal side-wall 158 must perform a transverse movement in the same manner as the other side-wall and also must be able to be displaced longitudinally. For this purpose, the side-wall 158 is supported, so as to be transversely slidable, by supports 163,163' which are interconnected by a slide 164 which travels on a guide 165 with a matching profile, for example in the form of a dovetail or equivalent form, which is fixed laterally and longitudinally with respect to the support body 160. The supports 163,163' have fixed, longitudinally underneath them, a rack 166 with toothing directed downwards and co-operating with the pinion 167 of a speed and phase electronic control motor 167', which, upon operation, longitudinally displaces the comb-shaped side-wall 158. The slides, by means of which the side-wall 158 co-operates with the supports 163,163', are interconnected by a slide 168 which travels on a straight guide 169 parallel to the side-wall 158 and connected to a guide/slide group and to a horizontal rectilinear actuator 170 which is transverse to the said guide and by means of which the said side-wall 158 may be provided with the necessary transverse movement. At the start of a working cycle, the side-walls 157 and 158 are in a position at a distance from one another, as can be seen in FIG. 14, and the comb-shaped side-wall 158 is displaced longitudinally so as to be arranged with the first of the recesses of its sawtooth profile, opposite means 151 for stopping the caps, following which the side-walls 157,158 return into the position where they are located as close as possible to one another and the means 151 open so as to allow a cap to enter into the first recess of the side-wall 158 which then performs a longitudinal movement so as to return into the original position facing the side-wall 157, while a cap is arranged in each recess of this side-wall 158 and then in synchronism the said means 151 close the outlet of the guide 150. Once the predefined number of caps have been positioned in the station 146, raising is performed through openings in the end wall 156 of a comb-shaped structure 171 which is actuated by a cylinder 172 and which, with its teeth and/or recesses directed upwards, co-operates with the caps T so as to centre them correctly, following which the side-walls 157 and 158 are operated so as to move away from each other, as can be seen in FIG. 14, so as to release the caps laterally. In synchronism, the capping head 139, which has previously been arranged in position in the station 146, is lowered and with grippers 143' grips the caps T, following which it moves upwards and in synchronism is displaced and then moves downwards into the station Z5 in order to apply the said caps to the first odd-numbered bottles. During the next cycle, the bottles are made to advance by an interval equal to the distance existing between one bottle and the next one and the caps will be mounted on the first even-numbered bottles. During the following cycle, the bottles are made to advance so as to align with the capping head the last bottles which will be sealed with two further travel movements of the capping unit, now removing four caps each time from the station 146. In this case the comb-shaped side-wall 148 will be loaded with only four caps. By means of the electronic control motor 167' and by means of the intercepting device 151, the machine control unit will be able to achieve easily the abovementioned object.

After capping of the whole group of bottles, the gripper P4 opens and returns into the filling station Z4 in order to grip new bottles to be sealed, while the already sealed bottles are conveyed away by the conveyor 132 and by a following acceleration conveyor 132'. The capping station Z5 may be provided with known means for marking and/or for otherwise ensuring the discarding by other suitable means, not shown, of those bottles, capping of which proved due to be inadequate during known torque tests or tests of another type carried out in the said station Z5.

From FIG. 1 it can be seen that the machine is provided in the internal corner, between the extruder and the bottle processing line, with a jib crane 173 which pivots on a vertical fulcrum 174 and the arm of which has an extension such that it is able to serve the entire extruder and all the stations from Z1 to Z3. The stations Z4 and Z5 are served instead by a small jib crane 175, with arm and forearm which are hingeably joined together on a vertical axis and pivotably mounted at 176 on the machine frame. By means of these cranes, it will be possible to perform easily the operations involving maintenance and setting-up of the machine for the production, filling and sealing of bottles of different sizes. The electric wiring consoles 177 are, for example, located on the rear side of the bottle processing line and comprise a programmable electronic control unit 178 which governs automatic operation of the entire machine. The front side of the machine is provided with a longitudinal gangway 179 on which one or two operators may stand, said operators having access to operating and control consoles 180,180', with all the emergency controls as required. The whole machine is provided with a protective housing, not shown, with partly transparent hatches, inside which a controlled atmosphere, useful for the packaging of products which require this condition, may be created if necessary.

It is understood that the description refers to a preferred embodiment of the invention, to which numerous variations and modifications, in particular of a constructional nature, may be made, said variations or modifications for example relating to the use of a filling station different from that described and capable, for example, of performing volumetrically controlled filling, all of which without departing from the underlying principle of the invention, as described above and as illustrated and claimed below. In the claims, the reference numbers shown in brackets are purely exemplary and do not limit the protective scope of the said claims.

What is claimed is:

1. A machine for manufacturing, checking, filling with a liquid product and capping with caps, containers of thermoplastic material, said machine comprising:

at least one extruder group adapted to produce several parisons arranged alongside each other;

a mould group and counter-mould group having several adjacent cavities, said mould group and counter-mould group mounted on self centering horizontal-movement slides located on a translatable carriage which is adapted to be transferred alternately by suitable driving means from a position where said cavities are centered with respect to said parisons and then closed so as to grip a section of said parisons of predetermined length, to a first processing station, said first processing station comprising a blowing station adapted to perform blowing of a gripped parison, thereby forming the containers;

pitching means for lifting and lowering of said at least one extruder group;

further processing stations for the containers, aligned with one another and with respect to said blowing station, said processing stations comprising a second processing station for sprue removal and calibration of a mouth of the containers, a third processing station for checking compression and sealing strength of the containers, a fourth processing station for the filling of the containers, and a fifth processing station for capping of the containers;

gripper groups adapted to perform a self centering closing and opening movement, and to synchronously grip a group of containers produced in the blowing station and to transfer said group to said further processing stations and then to an outlet;

a waste conveyor arranged underneath said processing stations adapted to collect and remove production waste produced in said processing stations; and a programmable electronic control unit for governing operation of the machine.

2. The machine according to claim 1, further comprising labelling means for introducing thermo-adhesive labels into said cavities of said mould group and said counter-mould group.

3. The machine according to claim 1, in which said translating carriage is cantileverly mounted on straight horizontal carriage guides, thereby providing accessibility to said carriage.

4. The machine according to claim 3, further comprising:

additional horizontal guides formed as continuations of said carriage guides, said additional horizontal guides for the sliding of a gripper carriage which cantileverly supports a first set of three grippers, each gripper having a self centering closing and opening movement, each gripper located in succession to one another for transferring groups of containers between said first through said fourth processing station, said gripper carriage being actuated by said driving means which actuates said translating carriage.

5. The machine according to claim 4, in which said driving means comprises a horizontal fluid-pressure and double-acting cylinder having a body fixed to a base shoulder of the machine, said body having two ends; and a rod projecting from said two ends and being connected to said gripper carriage and said translating carriage.

6. The machine according to claim 4, wherein said gripper carriage comprises:

a horizontal frame which has guides transversely fixed thereon, upon which pairs of slides are slidingly moveable, said guides parallel to each other and with respect to a longitudinal axis of the machine, said guides being actuated with a self centering movement by means of respective pairs of double-acting fluid-pressure cylinders and of respective levers which are pivotably mounted in between an end of synchronization tie-rods;

comb-shaped jaws of two of said three grippers mounted on said slides, for transferring a group of containers between said first through third processing stations; and horizontal beams fixed to said slides of said second gripper and carrying said jaws of said third gripper for transferring a group of containers from said third station to said fourth station.

7. The machine according to claim 6, further comprising:

a first set of sprue-removal devices adapted to operate on the bottom of the containers, said first set of sprue-removal devices mounted on said slides which carry said jaws of said first gripper for transferring the containers from said blowing station to said second processing station; and a second set of sprue-removal devices adapted to operate on the top of the containers, said second set of sprue-removal devices located in said second processing station and adjustably supported by said base shoulder of the machine.

8. The machine according to claim 6, wherein:

said second gripper is adapted to transfer the containers from said second processing station to said third processing station, said second gripper has a first jaw directed towards said base shoulder of the machine and mounted in a fixed position an associated slide, and a second jaw mounted on an associated slide by means of a vertical guide/slide group and a vertical displacement actuator, thereby forming a vertically movable member;

said jaws of said third gripper comprising an external jaw and a second jaw, and one of said horizontal beams carrying said external jaw; and said vertically movable member has integral with it, said one of said horizontal beams such that said external jaw is operable from a high position, facing said second jaw in order to grip the containers, to a lower position, so as to allow selective discarding of defective containers located in said third processing station.

9. The machine according to claim 1, wherein said blowing station comprises:

a head having a plurality of vertical nozzles, said vertical nozzles directed downwardly, aligned and connected to a header for delivery of compressed gas, said head being slidably and cantileverly mounted on a vertical guide, said vertical guide mounted on a slide, said slide slideable on a support plate fixed to said base shoulder of the machine by means of an adjusting device;

an adjustment assembly for adjustment of a height position of the said head mounted on said vertical guide, said adjustment assembly for moving said head vertically for insertion and extraction of said nozzles into and out of said cavities of said mould and said counter-mould group; and a fixed extraction comb above said mould and counter-mould group through which said nozzles may pass for extraction of said nozzles from the containers.

10. The machine according to claim 1, in which said second processing station comprises:

a first slide mounted in a cantilever position on a first vertical guide and adapted to traverse thereon, said first vertical guide fixed onto a second slide traverseable on a second vertical guide, said second vertical guide having height adjusting means, said second guide mounted horizontally slidable on a support plate integral with said base shoulder of the machine;

a horizontal header mounted on said first slide;

vertical punches extended from said horizontal header and directed downwardly, said vertical punches connected to said header for circulation therein of a cooling liquid, said vertical punches shaped for entry into the mouth of the containers and surrounded by a respective extractor, each said extractor maintained in a raised position by an associated fluid-pressure cylinder fixed with a respective cylinder body onto said header; and at least one raising and lowering actuator fixed onto an arm and having a rod, said first slide connected to said rod, said arm fixed onto said second vertical slide.

11. The machine according to claim 1, wherein said third processing station comprises:
- a horizontal bench cantileverly supported by a base shoulder of the machine, via a vertical slide/guide group;
- adjusting means for allowing adaptation of a height position of said horizontal bench on which the containers are supported when released by a second transfer gripper; and
- suction holes provided on said bench for retaining the containers.

12. The machine according to claim 11, wherein said third processing station further compresses:
- a parallel horizontal bar located above said bench, said parallel horizontal bar supported by a slide, said slide cantileverly mounted on a vertical guide,
- an adjusting device fixed onto the base shoulder of the machine and attached to said vertical guide, said adjusting device for adjusting a height position of said vertical guide thereby adjusting a height position of said parallel horizontal bar; and
- said parallel horizontal bar having fixed thereon bodies of double-acting fluid-pressure cylinders directed downwardly, each cylinder having a rod on which there is mounted a bell member from which a probe may be pushed downwardly by resilient means projects at a bottom of said bell member and in an axial position, said probe closed at a rod end and opened at a bell member end, said probe connected to a pressurised gas source and to means which emit an electric signal proportional to pressure created by said gas source,
- whereby during operation, said rods are in a raised position such that the containers to be checked may be positioned underneath said rods, said cylinders are actuatable to insert said probe into the mouth of the associated container and to sealingly close the mouth of the container with said bell member, and gas is introduced into each container to verify, by means of said control means, whether pressure remains in the containers at a predetermined value within a predefined period of time.

13. The machine according to claim 1, in which said fourth processing station comprises:
- a horizontal bench cantileverly supported by a vertical slide/guide group, said horizontal bench operatively associated an adjusting device for adjusting a height position of said bench;
- a plurality of weighing scales mounted on said bench, each said scale having a pan for supporting one of the containers; and
- a nozzle for delivering the liquid product to be packaged, said nozzle positioned above each of the containers and controlled by a respective solenoid valve connected to a liquid supply tank.

14. The machine according to claim 1, further comprising:
- a fourth gripper for transferring the containers from said fourth processing station to said fifth processing station;
- an adjusting device for adjusting a height position of the said fourth gripper; and
- said fourth gripper having comb-shaped jaws mounted with self centering opening and closing means on a carriage slidable on straight guides parallel to a longitudinal axis of the machine and cantileverly fixed on a vertical guide/slide group, said vertical guide/slide group mounted on a base shoulder of the machine and associated with said adjusting device.

15. The machine according to claim 1, in which said fifth processing station further comprises:
- a rectilinear and cantilevered conveyor for the containers, actuated in synchronism with said fourth gripper;
- a capping head with several independent spindles for gripping and screwing caps, said spindles being mounted via vertical raising and lowering means on a carriage, said carriage adapted to slide on straight guides fixed onto a lintel of a bridge crane positioned transversely on shoulders of a base of the machine, said carriage also adapted to move on horizontal guides fixed longitudinally on said capping head, said carriage connected to a horizontal adjusting device which allows correct centering of said spindles with respect to the containers; and
- a supply station disposed laterally and parallel with respect to said conveyor, for cyclically supplying a row of caps to be picked up by said spindles of said capping head and then screwed onto the containers.

16. The machine according to claim 15, in which a number of spindles of said capping head is a submultiple of a number of containers which are cyclically transferred into said fifth processing station, and said fifth processing station adapted to perform capping of the containers in several successive stages involving gripping and application of said caps by said capping head, gradually feeding the containers by said fourth gripper, releasing capped containers from said fourth gripper at an end of a cycle, and discharging of the capped containers by suitable conveying means on which the capped containers rest.

17. The machine according to claim 15, wherein said fifth processing station comprises:
- a vibration device for arranging said caps in a single file and in uniformly direction and, by means of a guide, for transferring said single file of said caps with a cap cavity facing downwardly, to a rectilinear conveyor, said rectilinear conveyor for supplying said caps to a curved and horizontal guide, said horizontal guide having an outlet intercepted by intercepting means for stopping said caps, said intercepting means having an opened and a closed position, said outlet located at an end of a horizontal channel parallel to a row of containers to be capped, said horizontal channel defined, at a bottom, by a bottom guide, and laterally by parallel side-walls connected to opening and closing means,
- a first side-wall of said side-walls being straight;
- a second side-wall of said side-walls having a comb-shaped configuration with sawteeth directed towards said first side-wall, said sawteeth being of a number and with an arrangement such as to contain within recesses of said sawteeth, respective caps for gripping by said screwing spindles, said second side-wall connected to longitudinal moving means; and
- means for ensuring that, at a start of each operating cycle, said second side-wall is retracted such that a first of said recesses is in an initial part of a channel formed by said recesses and opposite said curved guide, said intercepting means is in an opened position for permitting a flow of caps, and said second side-wall is gradually brought back into an original position facing said first side-wall, such that said caps are engaged in said recesses of said second side-wall,
- said bottom guide having an opening through which a vertical comb may emerge to synchronically center said caps and arrange said caps correctly for gripping by said operating heads, while said first and second said side-walls synchronically are moved away from each other so as to allow gripping of said caps.

18. The machine according to claim 17, in which longitudinal movement of said second side-wall is ensured by rack-and-pinion means and by a speed and phase electronic control motor, and the machine further comprises means for controlling opening and closing of said intercepting means, to provide a variable quantity and arrangement of said caps arranged in said recesses of said second side-wall, and to avoid supplying said caps to spindles underneath which there is no container to be capped.

19. The machine according to claim 17, in which said fifth processing station has a vertical guide and horizontal guide, and slide groups operatively associated with adjusting devices for accommodating caps and containers of varying sizes.

20. The machine according to claim 1, further comprising:

a crane for facilitating operations of maintenance and size-changing operations of said extruder, associated mould-carrying carriage, and said first, second and third processing stations, said crane disposed in a corner zone between said extruder and a container processing line; and a second crane disposed between said fourth processing station and said fifth processing station, said crane adapted for facilitating maintenance and the size-changing operations of said fourth and said fifth processing stations.

* * * * *